Figure 1:
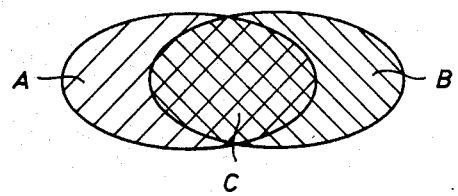
Figure 1:
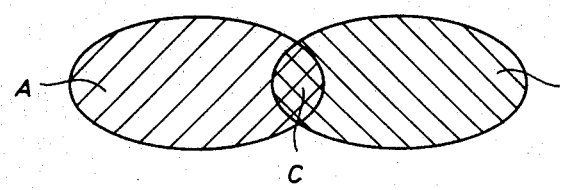

United States Patent [19]

Ankersson

[11] 4,356,017
[45] Oct. 26, 1982

[54] METHOD AND APPARATUS FOR CATCHING A PARTLY FIBRATED MINERAL BLOOM

[75] Inventor: Bill Ankersson, Skövde, Sweden

[73] Assignee: Rockwool Aktiebolaget, Sweden

[21] Appl. No.: 235,606

[22] Filed: Feb. 18, 1981

[30] Foreign Application Priority Data

Feb. 22, 1980 [SE] Sweden .................................. 8001395

[51] Int. Cl.³ ............................................. C03B 37/05
[52] U.S. Cl. ............................................. 65/8; 65/10; 65/12; 65/15; 209/156
[58] Field of Search ....................... 65/2, 10, 12, 8, 15, 65/5, 14; 209/156

[56] References Cited

U.S. PATENT DOCUMENTS 3,159,475 12/1964 Chen et al. .............................. 65/15
3,623,853 11/1971 Keib ...................................... 65/10 X
4,252,550 2/1981 Schlachter et al. ....................... 65/2

FOREIGN PATENT DOCUMENTS 160756 7/1957 Sweden .................................... 65/10

*Primary Examiner*—Robert L. Lindsay, Jr.
*Attorney, Agent, or Firm*—Larson and Taylor

[57] ABSTRACT

A method and an apparatus for catching a partly fibrated mineral bloom which is thrown out from rotating fibrating wheels (1, 2), which are supplied with a mineral bloom. The catching of the partly fibrated mineral is made by one or several jets or flows of a liquid medium, especially water, which are directed to the fibres at an angle to the outflow direction of the fibres from the fibrating wheel or wheels (1, 2). The liquid flow or flows can be provided in one or several sets completely or partly extending round the periphery of the fibrating wheels (1, 2). The liquid flows can be flat or bowformed jets which are provided so as to completely surround the periphery of the fibrating wheels. By means of the liquid flows the partly fibrated mineral is brought away for further treatment, especially for separating fibres from non-fibrated particles, so called pearls.

15 Claims, 10 Drawing Figures

METHOD AND APPARATUS FOR CATCHING A PARTLY FIBRATED MINERAL BLOOM

Mineral fibres can be manufactured in many different ways from blooms of mineral materials. Basically there are three main methods:
(a) By a drawing operation
(b) By a blowing operation
(c) By a throwing operation The drawing operation gives a fibre mass substantially without any portion of unfibrated material. With some reserve this can also be said of the blowing operation in which the fibre formation is made by means of hot gas flows.

Otherwise blowing and in front of all the throwing operations only gives a partial fibrating of the supplied mineral bloom since so called shots are formed during the fibrating operation. In order to avoid such pearls from impairing too much the properties of the product, it is generally tried to make a separation already in the fibrating process, generally by having an air or gas flow deflecting the partially fibrated material as appearing when leaving the place where the fibrating takes place. In practice the separation, however, is never perfect but in the best case a first fraction is obtained which is shot-rich and fibre-poor and a second fraction is obtained which is fibre-rich and shot-poor. As mentioned above the partition of said two fractions can be made more or less successfully.

This is illustrated in FIGS. 1a and 1b of which FIG. 1a shows a little successful separation in that the pearls represented by the area A are incompletely separated from the fibres which are represented by the area B. The area C which is common for the two areas A and B represent the part of the partially fibrated flow of material in which pearls and fibres appear mixed up.

In a corresponding way FIG. 1b shows a more successful separation in which the common field C provides a much less part of the total flow of material.

Figure 2:
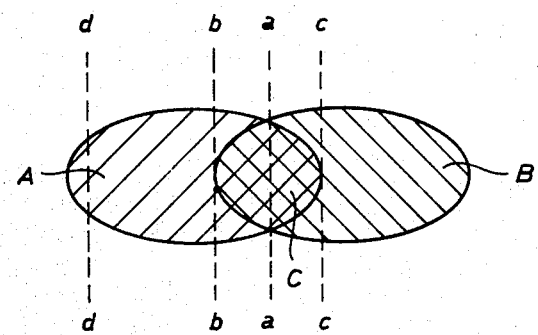

The partition may also be moved so that one of the fractions is more clean than the other. This is illustrated in FIG. 2. Also in this figure the area A represents the pearls and the area B represents the fibres. If the flow of material is now parted as indicated with line a—a two portions are obtained, one containing more pearls than fibres and the other of the opposite character. If it were possible to provide a partition as shown by line b—b one part flow should comprise only pearls whereas the other part flow should comprise both fibres and some pearls. Another possible partition of interest is represented by line c—c which divides a fibre portion which is completely free from pearls.

For normal use of mineral fibres, especially in the form of wool for insulating purposes, a little portion of pearls is not particularly disadvantageous. For such purposes it is of greater importance that as large portion as possible of the fibres is used. The partition between the two phases thereby generally is made somewhere between the lines a—a and b—b. The line b—b like the line c—c represent hypothetic partitions which cannot be reached in practise in the present manufacturing processes which are very stochastic to their nature.

For such fields of use in which a fibre mass having an optimum little amount of pearls is wanted, for instance fibre for reinforcement of polymeric materials there is consequently in practise no possibility of locating the line of partition to the line c—c. Even if this should be possible such partition would involve a large loss of fibres as represented by the portion of the area B, which in FIG. 2 is located on the left hand side of the line c—c.

For making it possible to make use of an optimum large amount of the fibre there has so far not been any other way than locating the line of partition so that most fibres are received in one fraction. The said fraction, which consequently contains a large amount of pearls, is thereafter moved to another station in which the material is dispersed in a water bath preferably by means of a wetting agent as dispersing means. The fibre mat supplied to the water bath often is present in wool form having a pellet like structure. When dispersing the said fibre mat in the water bath any pellets are broken up into separate fibres. The dispersion thereby obtained may thereafter be subjected to more exactly operating separation steps, for instance by means of some type of wet cyclones. Not until after this step a pure fibre mass has been obtained.

The fibre mass thus obtained does not contain all fibres which have been manufactured. The lost fibres are present among the main portion of the pearls and provides a little portion thereof. It may be possible to separate also the said fibres from the pearls in a special separation step, but the fibres have already been subjected to such thermal and mechanical stresses that they have lost a substantial part of their good properties. Further such special separation step should involve additional actuation and destroying of the fibres.

It may be possible to completely avoid the said complex of problems by carring out the separation as far at the left hand side as represented by the line d—d of FIG. 2. This may be done by extremely strong gas flows, but this should lead to a correspondingly strong turbulent flow giving a pellet formation and entangled fibres. The pellets would include pearls, and for a complete separation it is necessary that the fibres are completely free from each others. This in turn necessitates a mechanical working which is disadvantageous. Pellet formed fibres, even without any pearls, is also disadvantageous when using the fibre materials for other purposes than for insulating purposes, for instance for reinforcing purposes.

It has now been shown that it is possible to deflect the material being fibrated by means of jets or flows of a liquid medium, especially water jets or water flows. The invention consequently relates to a method and an apparatus for catching a partially fibrated mineral bloom which is ejected from rotating fibrating wheels to which a mineral bloom is supplied. As mentioned above jets or flows of a liquid medium, especially water is used for deflecting the fibres thereby formed.

It is surprising to the expert that the water does not disturb the fibrating process but rather is more indulgent to the fibres than even a relatively mild gas flow. It is still more surprising that a deflecting by means of water jets gives a far sharper separation between the fibre and pearl sections than previously known methods so that the situation is more like the one illustrated in FIG. 1b than that of FIG. 1a.

An effecting performance of the invention is obtained in that the water flows are formed as flat jets providing a part of a cylindric or conical surface. The flat jet may in turn be formed in several separate jets the edges of which get together before they meet the material ejected from the fibrating apparatus, especially the fibrating wheels. The latter embodiment of the jets is more easy to handle since it gives great possibilities to vary the flow and the speed at different places, since the amount of material ejected from the fibrating wheel is different for different parts of the wheel. The amount is largest adjacent the place where the mineral bloom is supplied and it successively decreases round the peripheries.

An embodiment of the invention which has still greater possibilities of being adapted and optimized is the one in which several flat jets are provided on different levels over each other and in different areas so as to provide a covering and overlapping pattern as seen in the direction in which the material is thrown out from the surface of the fibrating wheel. If the overlapping of the jets is sufficiently large a relationship is obtained giving a great safety that any particle thrown out from the fibrating wheel is actuated by the jet or jets even if there should be any interruption in the supply of water to the separate nozzles from which the water jets emanate.

The jets ought to be substantially parallel to the axes of the fibrating wheel but they may form an acute angle thereto, preferably so that the jets converge towards each other.

In the case that several rotating fibrating wheels coact in fibrating the mineral bloom the water jet is provided in connection to the outer periphery of the wheel combination in the same way as in the previously known apparatus using air or gas flows.

It has shown that it is advantageous if the water contains a wetting agent. Thereby the tendency of the fibres to form bundles or pellets is reduced or eliminated.

The invention will now be described more in detail with references to the accompanying drawings. It is however to be understood that the embodiments of the drawings or any other described apparatus and method are only illuminating examples and that the invention is restricted only by the appended claims.

In the drawings FIGS. 1a, 1d and 2, as mentioned above, are diagrammatical representations of different degrees of separation of pearls and fibres respectively of a partly fibrated mineral bloom.

Figure 3:
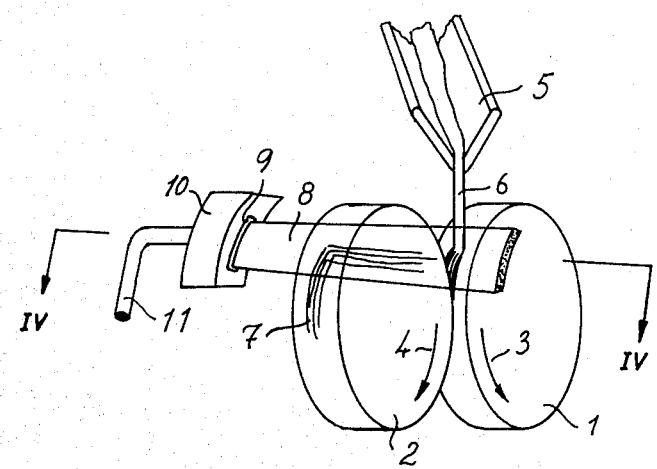
Figure 4:
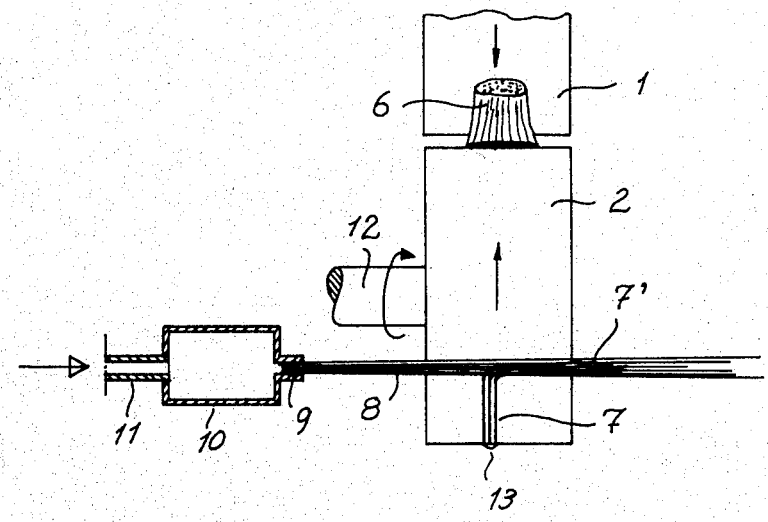
Figure 5:
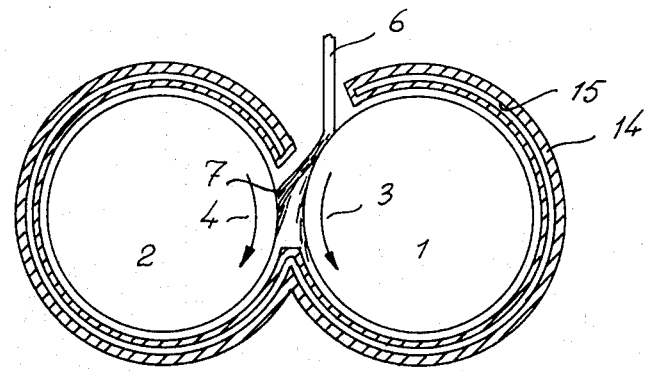
Figure 6:
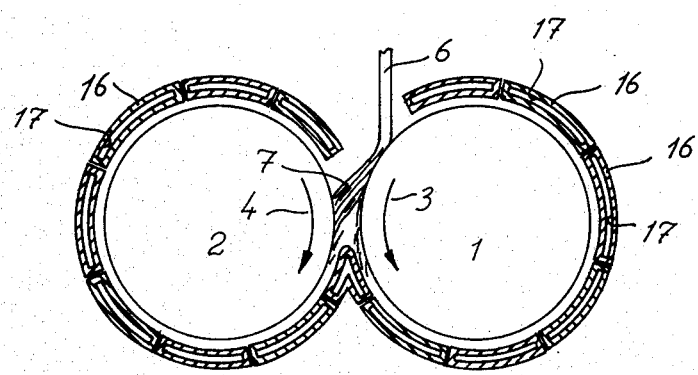
Figure 7:
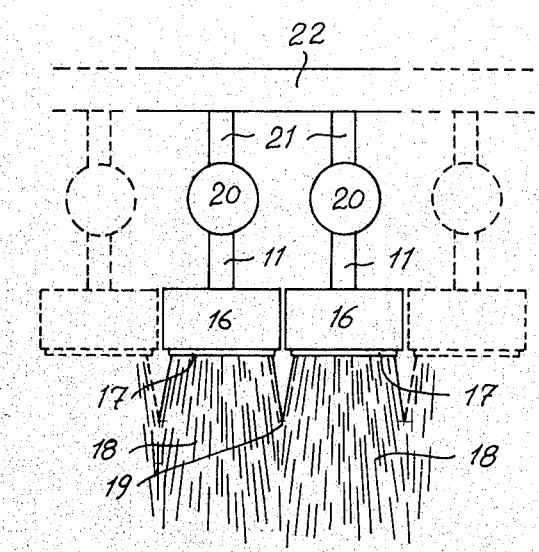
Figure 8:
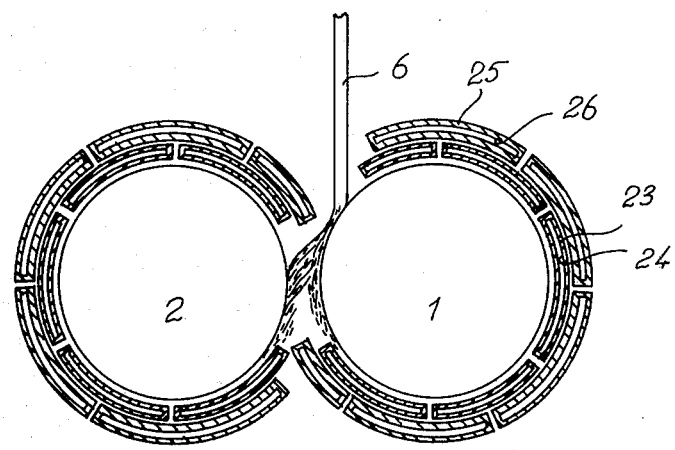
Figure 9:
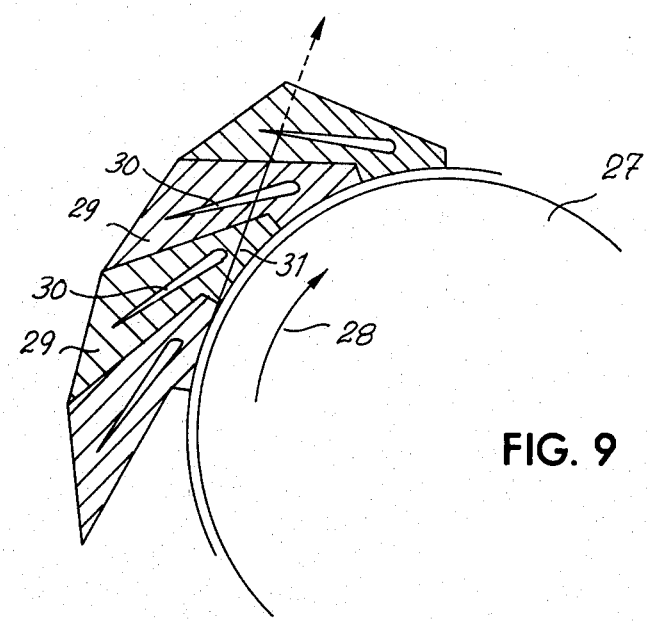

FIG. 3 diagrammatically shows an apparatus for executing the method according to the invention. FIG. 4 is an axial side view of a part of the apparatus according to FIG. 3, and FIGS. 5 and 6 show the apparatus according to FIG. 3 in a vertical transversal plane. FIG. 7 shows the apparatus according to FIG. 6 in an axially spread outplane. FIGS. 8 and 9 show additional arrangements of the fiberizing wheels.

In FIG. 3 is shown a fibrating apparatus comprising two wheels 1, 2, so called spin wheels, for fibration of a mineral bloom. The wheels rotate in the directions indicated with the arrows 3 and 4 respectively. From a flute the mineral bloom 6 flows downwards to meet the wheel 1. From wheel 1 a part from the mineral bloom is transferred to the fibrating wheel 2 by force action whereas another part of the bloom remains on the wheel first meeting the bloom. By the centrifugal force the mineral bloom is thrown out from the two wheels in the tangential direction, whereby a large number of fibres are formed.

In the drawing a bundle of such fibres have been marked exaggeratedly. Actually thousands of fibres are formed concurrently on the wo wheels, but for the sake of simplicity this has been excluded.

Against the fibres 7 accordingly thrown out from the surface of the wheel a jet 8 substantially consisting of water is directed. The jet 8 comes from an opening 9 of a nozzle 10 which in turn is fed over a conduit 11. At the place where the jet hits the fibre 7 this is brought by the jet and is deflected from its previous path of movement as marked with the line 7' of the figure. Of course the nozzle 10 illustrated in the drawing cannot deflect more than a portion of the fibres which are thrown out from the wheel 2. It is necessary to use a substantially wider nozzle or to use several nozzles as shown in the following drawings.

In FIG. 4 the same operation is shown in another view. The wheel 2 is in this case seen from the side rotating around its shaft 12. From the surface of the wheel, on which a ring 13 of mineral wool is present fibres are thrown out substantially in the tangential direction. When the fibres 7 meet the jet 8 they are deflected as marked with 7'. As shown in FIG. 4 the jet 8 leaves an opening 9 of the nozzle 10 which is fed with water from the conduit 11.

FIG. 5 shows the two fibrating wheels 1 and 2 which are arranged side by side. The first wheel 1 is hit by the jet of mineral bloom 6 which falls vertically to the pattern surface of the wheel. The combined wheels are surrounded by a diffusor 14 in which there is a slot 15 which substantially completely encloses the wheel combination.

In FIG. 6 is shown a similar arrangement in which the nozzle or the diffusor 14 as shown in FIG. 5 corresponds to a series of nozzles 16 in which there are a corresponding number of openings 17. If the outflow does not follow through a continuous opening like the one in FIG. 5 but through several different openings they should be provided as shown in FIG. 6. A number of distributed nozzles 16 each having an opening 17 and are placed side by side. In FIG. 7 two of the said nozzles 16 whereas the adjacent two nozzles are marked with dotted lines.

The nozzles 16 are provided so that the flat jet from each nozzle diverge in the plane whereby two adjacent jets 18 meet at a point 19 in front of the point where the fibres reach the flow of fluid. FIG. 7 also shows how the nozzles are fed by conduits 11 including control valves 20. The flow medium is supplied to the control valves 20 from a supply conduit 22 over branch conduits 21. By the actuation of the control valves 20 each jet 18 can be adjusted so that the dynamic force thereof meets the request at the very part of the wheel periphery where the nozzle in question is placed. It is obvious that different parts of the wheel periphery throw out different large amounts of melted mineral depending on the actual distance to the place where the jet of mineral wool 6 is supplied.

FIG. 8 shows an arrangement in which there is an inner set of nozzles 23 having openings 24 and in addition thereto an outer set of nozzles 25 having openings 26 provided round the fibrating wheels 1 and 2 which are fed with the jet of mineral bloom 6. The openings 26 are provided so as to cover the space between the jets coming from the openings 24.

In FIG. 9 is shown an arrangement in which the fibrating wheel 27 to which the mineral wool is supplied rotates in the direction of the arrow 28. The wheel 27 is surrounded by a series of nozzles 29 having openings 30 arranged as tangents of the wheel 27 but in a direction which is opposite to the direction in which a particle is thrown out from the surface of the wheel. The openings 30 are wider at the part located closest to the wheel and they successively becomes narrower in the direction opposite to the wheel. In a direction in which a particle thrown out from the wheel should have in FIG. 9, symbolized with the line 31, the openings 30 are superposed on each other in such a way that all tangents 31 pass at least two openings.

It is to be understood that the expert within the technical field may modify the method or the apparatus according to the invention within wide limits without departing from the inventional concept as defined by the following claims.

I claim:

1. Method of catching a partially fibrated mineral bloom which is thrown out from rotating fibrating wheels (1, 2) which are supplied with a mineral bloom (6), characterized in that the fibrated mineral is caught by means of jets or flows of a liquid medium, especially water, which is directed to the fibrous material at an angle to the out throw direction thereof from the fibrating wheel or wheels (1, 2) whereby the fibre material is deflected from the out throw direction and is brought away by the liquid flow for further treatment.

2. Method according to claim 1, characterized in that the deflecting of the fibre material is made by a liquid flow consisting only of water.

3. Method according to claim 1 or 2, characterized in that the liquid flow or flows are formed as flat jets.

4. Method according to claim 3, characterized in that the liquid flows are formed as several flat jets provided round the periphery of the fibrating wheels (1, 2) whereby the jets form a part of a cylindrical or conical surface each axes of which is parallel to the axes of its respective fibrating wheel or forms an acute angle thereto.

5. Method according to claim 1, characterized in that the liquid flow is formed as several sets of jets (24, 26) provided radially outside each other, and in which the different radial sets of jets (24, 26) are displaced in relation to each other so that each jet of one set of jets bridges a space between two jets of the other set of jets.

6. Method according to claim 1, characterized in that the liquid flow is formed as several flat jets (30) which overlap each other, and in which each jet (30) is located in a plane which is substantially tangential to the actual fibrating wheel (1, 2) and which crosses at least one and preferably two other jets.

7. Method according to claims 1, 2, 4, 5 or 6 characterized in that the water of the liquid flow contains a wetting agent.

8. Apparatus for catching a partially fibrated mineral which comprises rotating fibrating wheels (1, 2), means for supplying mineral bloom (6) to said wheels, means (e.g. 8–11) comprising one or more nozzles having an elongated outflow opening or openings, respectively, provided completely or partly around the periphery of one or several fibrating wheels for supplying a jet or flow (8) of a liquid medium towards the mineral fibres (7) which are thrown out from the fibrating wheel or wheels (1, 2) in a direction which differs from the direction of movement of the mineral fibres.

9. Apparatus according to claim 9, characterized in that the means for supplying the jet or flow (8) of a liquid medium comprises a nozzle (10) which is supplied with pressurized water, positioned to throw out the mineral fibres at an angle which is substantially perpendicular to the direction of movement of said wheel or wheels.

10. Apparatus according to claim 8 or 9, characterized in that the nozzle (10) has an elongated outflow opening which is bow-formed with a radius the centre of which coincides with the centre of the fibrating wheel (1, 2).

11. Apparatus according to claim 8, characterized in that the means for supplying the liquid medium comprises several nozzles (e.g. 16) provided around the periphery of the belonging fibrating wheel (1, 2).

12. Apparatus according to claim 11, characterized in that the nozzle (14) is formed as a closed arc extending round two co-operating fibrating wheels (FIG. 5).

13. Apparatus according to claim 11, characterized in that the nozzles (23, 25) are mounted in two or several sets provided radially outside each other, whereby the jets (24, 26) of one set of nozzles are provided so as to bridge over spaces between jets of another set of nozzles (FIG. 8).

14. Apparatus according to claim 11, characterized in that the nozzles are formed as several separate nozzles (29) having flat outflow openings (30) which overlap each other and are provided at such angle that a tangent of one outflow opening (30) crosses at least one and preferably several flat jets from the adjacent nozzles (FIG. 9).

15. Apparatus according to any of claims 8, 9, 11, 12, 13, or 14, characterized in that the apparatus comprises means for supplying the jet of water under pressure together with a wetting agent.

* * * * *